Figure 1:
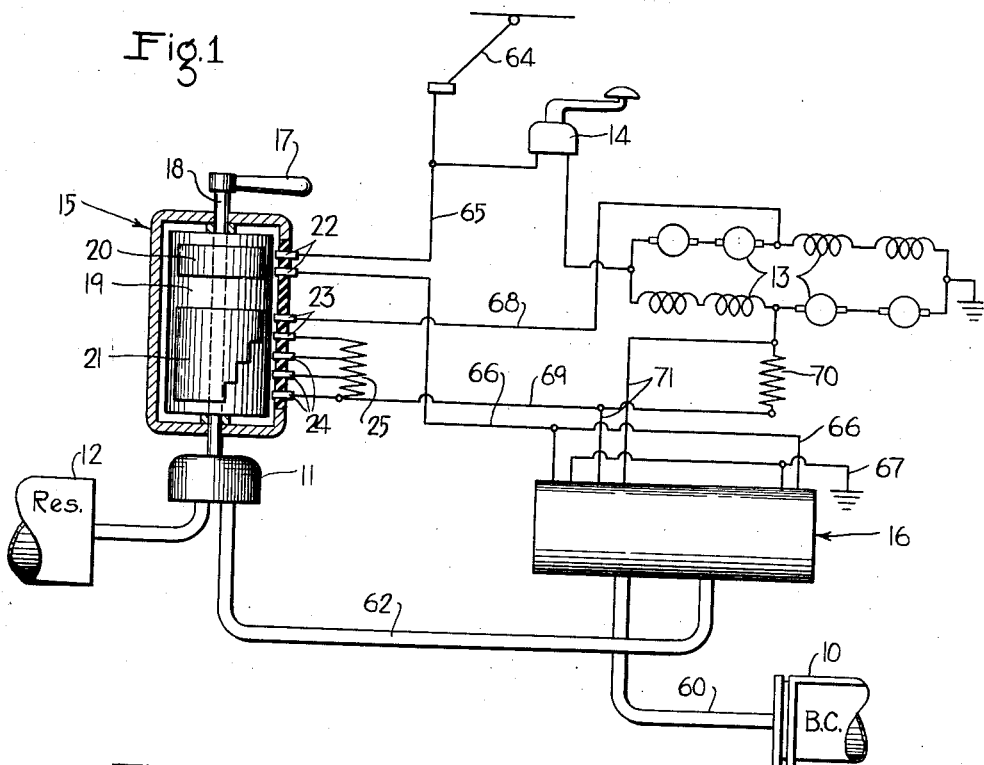

June 22, 1937.  J. B. GROSSWEGE ET AL  2,084,680

ELECTRIC BRAKE DEVICE

Filed May 12, 1936

INVENTOR
JOHN B. GROSSWEGE
JOHN CANETTA
BY Wm. N. Cady
ATTORNEY

Patented June 22, 1937

2,084,680

UNITED STATES PATENT OFFICE 2,084,680

ELECTRIC BRAKE DEVICE

John B. Grosswege, Edgewood, and John Canetta, Wilkinsburg, Pa., assignors to The Westinghouse Air Brake Company, Wilmerding, Pa., a corporation of Pennsylvania Application May 12, 1936, Serial No. 79,254

15 Claims. (Cl. 303—3)

This invention relates to electric brake devices, and more particularly to a device for forming an interlock between an electric brake system and a fluid pressure brake system.

Recently high speed traction and railway vehicles have been placed in operation provided with a brake equipment including an electric brake system and a fluid pressure brake system. When the brakes are applied the fluid pressure brakes are held suppressed by an interlocking valve means so long as the electric brakes are effective in producing the desired degree of braking effect. When the degree of electric braking effect diminishes below the desired value then the fluid pressure brakes are applied to an increased degree to compensate for or make up the deficiency in the electric braking effect. The particular mechanism forming the interlock between the two brake systems is sometimes referred to as a "compensating" valve mechanism or device. An example of a brake system of the character aforementioned including such a device is that described and claimed in the pending application of Ellis E. Hewitt, Serial No. 26,394, filed June 13, 1935.

In practice, it has been found that in brake equipments of this type the compensating or interlock valve device did not properly control the degree of application of the fluid pressure brakes in accordance with the degree of application of the electric brakes, due to the magnetic characteristics of the electrical portion of the valve device, which would not permit a direct or straight-line relation to be established between the electrical effect produced by the electric brake system and the pneumatic effect produced by the fluid pressure brake system. Accordingly, therefore, an improved form of interlock or compensating valve device was developed as described and claimed in the application of Rankin J. Bush, Serial No. 79,267, filed on the same day as the present application.

In the Bush valve device, means in the form of a special exciting winding is provided to cause the braking effect produced by the fluid pressure brakes to be controlled more nearly in a straight-line relation to the braking effect produced by the electric brakes. The exciting winding is at the time of initiating an application of the brakes connected to the power supply from the trolley. While this valve device has proven satisfactory and efficient in actual service, there are, however, conditions under which it possesses disadvantages. One of these conditions is that arising when the trolley voltage fluctuates over fairly wide ranges. When the trolley voltage thus fluctuates the desired straight-line relation between the fluid pressure braking effect and the electric braking effect is altered, and there is produced an undesired relation between the braking effects produced by the two brake systems.

In the present invention we propose to provide an interlocking or compensating valve device which will provide the same direct or straight-line relationship between electric braking and fluid pressure braking regardless of the degree or range of variations in trolley voltage, and regardless of the range of variation of the degree of electric braking.

In addition, and as a further object of our invention, we contemplate a valve mechanism of the character aforesaid which is simple in construction, sensitive in operation, and which possesses operating characteristics rendering it particularly efficient and effective for the intended operation.

Other objects and advantages of our invention will appear more fully from the following description, which is taken in connection with the attached drawing, wherein, Fig. 1 shows in schematic form a valve mechanism embodying our invention serving as an interlock between a dynamic brake system and a fluid pressure brake system.

Figure 2:
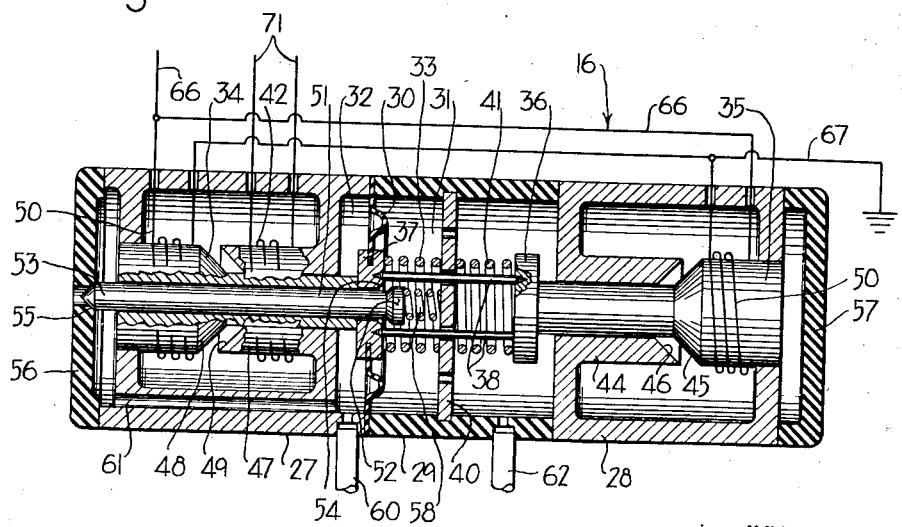

Fig. 2 shows in diagrammatic form a preferred form of a valve device embodying our invention.

Referring now to Fig. 1, the fluid pressure brake system shown comprises a brake cylinder 10, a brake valve device 11, and a reservoir 12 which is maintained charged from a compressor of the usual type (not shown).

The dynamic brake system comprises vehicle driving motors 13, which when operated as driving motors are supplied with power through operation of a power controller 14, and which when operated as brakes are connected in a dynamic braking circuit through operation of a brake controller device 15.

A valve device 16, embodying our invention, forms the interlocking means between the dynamic brake system and the fluid pressure brake system.

Considering the parts enumerated above more in detail, the brake controller device 15 is provided with an operating handle 17 secured to a shaft 18 carrying a drum 19 rotatable therewith. Secured to and insulated from the drum are two contact segments 20 and 21. The segment 20 is adapted to engage and bridge two stationary contact fingers 22, while the segment 21 is adapted to simultaneously engage and bridge two contact fingers 23 and to successively thereafter engage contact fingers 24, for the purpose of cutting out portions of a resistance 25.

The interlocking or compensating valve device 16 comprises two casing sections 27 and 28, which may be of magnetic material such as iron or steel, preferably joined together by a non-magnetic casing section 29, which may be of brass, copper or the like.

Suitably mounted between the two casing sections 27 and 29 is a flexible diaphragm 30, subject on its right hand side to pressure of fluid supplied to a chamber 31 and subject on its left hand side to pressure of fluid supplied to a chamber 32. In addition, the diaphragm is also subject on its right hand side to pressure of a spring 33, and on its left hand side to magnetic forces exerted on an armature 34 contained in the casing section 27.

There is a second and similar armature 35 contained in the casing section 28 and terminating in a member 36, which is in mechanical connection with a similar member 37 abutting with the other armature 34, by means of pins 38. Secured in the casing section 29 is a center wall 40 through which the pins 38 pass. Between this center wall and the member 36 is disposed a spring 41. Springs 33 and 41 are preferably duplicates of each other so as to exert the same spring pressure.

The armature 35 is slidable in a sleeve portion 44 and has a beveled face 45 matching a similar co-acting beveled face 46 in this sleeve portion. Similarly, the armature 34 slides in a like sleeve portion 47 and has a beveled face 48 matching a co-acting beveled face 49 in the sleeve portion 47. Disposed on the sleeve 47 is a "measuring" winding 42, which when energized produces a magnetic attraction for the armature 34 only.

The two armatures 34 and 35 are preferably made as near duplicates as possible, and each carries a like winding 50 thereon, that is, each winding has the same number of conductor turns so as to produce the same magnetic force when energized to a like degree.

Slidably disposed in an aperture extending lengthwise of the armature 34 is a valve stem 51 terminating at one end in a supply valve 52 and terminating at the other end in a release valve 53.

The supply valve 52 co-acts with a seat 54 carried by the member 37, while the release valve 53 co-acts with a seat 55 in a cap 56 secured to the end of the casing section 27. This cap 56 is preferably composed of some non-magnetic material, as for example copper, brass, bakelite or the like. A similar cap 57 is secured to the end of the casing section 28. The release valve 53 is normally held seated by a light spring 58 reacting between the head of the supply valve 52 and the center wall 40.

In the normal position of the diaphragm 30 the supply valve 52 is unseated. Fluid under pressure supplied to the chamber 31 may therefore flow past this unseated valve to the chamber 32, which is in constant open communication with the brake cylinder 10 by way of pipe 60. When, however, the diaphragm 30 is actuated to the right to seat the valve 52 this communication is cut off, and if the diaphragm is actuated further to the right the release valve is unseated to permit the release of fluid under pressure from the brake cylinder to the atmosphere, by way of chamber 32, passage 61 and past the release valve 53.

The brake valve device 11 is preferably of the self-lapping type, that is it functions to supply fluid under pressure to application pipe 62, from the reservoir 12, to a degree corresponding to the degree or extent of movement of the brake controller handle 17 into an application zone. This valve device may be of a conventional type and for that reason is not described in detail.

The operation of this embodiment of our invention is as follows:

Operation

When a vehicle equipped with the brake equipment illustrated is running, the brake controller handle 17 is maintained in the release position, as indicated in Fig. 1, and the parts of the brake equipment will be in the positions illustrated. The operator may then supply power to the vehicle driving motors 13 through operation of the power controller 14.

When it is desired to effect an application of the brakes the power controller 14 is first thrown to the off position. The operator then turns the brake controller handle 17 into the application zone to a degree corresponding to the desired degree of application of the brakes.

As the drum 19 is thus rotated, contact segment 20 engages and bridges the two contact fingers 22. This supplies current from a trolley 64 to the two windings 50 in the valve device 16, through a circuit including conductor 65, contacts 20 and 22, conductor 66, the windings 50, and ground connection 67.

At the same time, the contact segment 21 bridges the two contact fingers 23, and one or more of the contact fingers 24, to connect the vehicle motors in a dynamic braking circuit including conductor 68, contact fingers 23 and contact segment 21, a portion of the resistance 25 (except in the full service position of handle 17), conductor 69, and resistance 70. The motors are therefore operated to produce a dynamic braking effect.

At the same time the motors are connected in a dynamic braking circuit, the brake valve device 11 is operated to supply fluid under pressure to the application pipe 62 to a degree according to the degree or extent of movement of the handle 17 into the application zone. Fluid under pressure then flows from the application pipe 62 to the chamber 31 in the interlocking valve device 16.

Now when the two windings 50 in the compensating valve device are energized from the trolley they produce equal magnetic forces acting in opposite directions. The force acting on the armature 34 is therefore the same as the force acting on the armature 35, and because of the mechanical connection between the two members 36 and 37 provided by the pins 38 the two armatures do not move. If, however, the two armatures were to move together, either to the right or to the left, the gap between each and its respective sleeve, 44 or 47, would diminish or increase, depending upon the direction of movement, so that the force of attraction between each armature and its sleeve would increase or decrease. However, the two springs 33 and 41 are designed to counterbalance the increasing or decreasing force of attraction due to such a change in gap length, so that the net force effect on the two armatures will be unaffected by changes in gap length.

Now when the dynamic braking circuit is closed the "measuring" winding 42, which is connected across the resistance 70 through conductors 71, will be energized to a degree proportional to the degree of dynamic braking current. Energization of this winding will produce an additional force acting on the armature 34 to move it, together with armature 35, to the right proportional to the degree of dynamic braking current.

It is intended that when the dynamic brakes are producing a degree of braking corresponding to the position of handle 17 in the application zone, that winding 42 will be energized to a degree sufficient to seat the supply valve 52 and thus close communication between chamber 31 and chamber 32. Fluid under pressure will therefore not be supplied to the brake cylinder to any appreciable degree, and the application of the fluid pressure brakes will thus be suppressed.

If, however, the dynamic brakes should for any reason fail to produce a degree of braking corresponding to the brake controller handle position, then the force produced by winding 42 will be insufficient to seat the supply valve 52 and fluid under pressure will flow past this unseated valve to the brake cylinder. When the combined pressure acting to the left of diaphragm 30 due to fluid pressure in chamber 32 and that due to energization of the winding 42 overbalances the pressure acting to the right of the diaphragm due to fluid pressure in chamber 31 and spring 33, then the supply valve 52 will be seated. The pressure established in the brake cylinder under these conditions will be that just necessary to supply the added braking effect required according to the brake controller handle position. Thus the fluid pressure brakes merely act to supplement the dynamic brakes.

Now if the two windings 50 and the two armatures 34 and 35 associated therewith were not provided in the compensating valve device 16, then the fluid pressure brakes would not be applied exactly according to the deficiency of braking produced by the dynamic brakes, but would be applied over at least a part of the range of braking to a different degree.

This is particularly true when the dynamic braking current diminishes to low values, so that at or near the end of a stop instead of being able to limit the degree of braking to a relatively low degree so as to produce a smooth stop, the fluid pressure brakes would be applied to a relatively high degree, thereby producing a rough stop. This is due to the fact that the magnetic forces produced alone by winding 42 are not exactly proportional to the current in this winding, and consequently does not accurately weigh the pressure of fluid supplied to the brake cylinder according to current in the winding.

With the arrangement of windings 50 and armatures 34 and 35 as shown, this error is corrected and brake cylinder pressure is accurately weighed against dynamic braking current. Therefore, as the speed of the vehicle diminishes and the dynamic braking effect decreases with it, the brake cylinder pressure will be increased proportional to the decrease in dynamic braking, so that the total degree of braking will at no time substantially exceed that corresponding to the brake controller handle position.

If the brake cylinder pressure should rise to a value exceeding that corresponding to brake handle position, then the diaphragm 30 will be actuated to the right far enough to unseat release valve 53 and thereby release fluid under pressure from the brake cylinder until it will have diminished to the desired value.

As the vehicle is brought to a stop, the dynamic braking will diminish to zero and brake cylinder pressure will rise to a value corresponding to brake controller handle position. To release the brakes, the operator turns the brake controller handle 17 to release position, and thereby releases fluid under pressure from the application pipe 62, and consequently effects a full release from the brake cylinder 10 to the atmosphere. This release will be readily effected, because since there will be no current in winding 42, release valve 53 will first unseat to vent the brake cylinder to the atmosphere and subsequently when there is insufficient brake cylinder pressure to hold this valve unseated valve 52 will be unseated and there will be no opposition to a complete release.

While we have described our invention with particular reference to one embodiment thereof, it is to be understood that we do not wish to be limited to the details of this embodiment, nor otherwise than by the spirit and scope of the appended claims.

Having now described our invention, what we claim as new and desire to secure by Letters Patent, is:

1. In a vehicle brake system, in combination, an electric brake system, a fluid pressure brake system, an electroresponsive valve device controlling a communication through which fluid under pressure is supplied to effect the operation of said fluid pressure brake system, and having an electromagnet operable to produce a magnetic force proportional to the degree of braking produced by said electric brake system to control the pressure of fluid supplied through said communication, and means for establishing in said valve device opposing magnetic forces to increase the fidelity of operation of said device.

2. In a vehicle brake system, in combination, an electric brake system, a fluid pressure brake system, valve means controlling a communication through which fluid under pressure is supplied to effect the operation of said fluid pressure brake system, electroresponsive means responsive to the degree of effectiveness of said electric brake system for controlling said valve means, said electroresponsive means having a winding energized according to the degree of braking effect produced by said electric brake system for controlling the pressure of fluid supplied through said communication, and electromagnetic means for producing opposing magnetic forces to effect a substantially direct relationship between energization of said winding and fluid pressures.

3. In a vehicle brake system, in combination, an electric brake system, a fluid pressure brake system, a valve device for controlling a communication through which fluid under pressure is supplied to effect the operation of said fluid pressure brake system, said valve device having an electromagnet energized according to the degree of braking effect produced by said electric brake system, and having pneumatic means operated according to the pressure of fluid supplied to effect the operation of said fluid pressure brake system, and a plurality of compensating electromagnets co-acting with said first electromagnet to improve the fidelity of operation of said electroresponsive means, whereby the pressure of fluid supplied through said communication is caused to correspond to the energization of said first electromagnet.

4. In a vehicle brake system, in combination, an electric brake device, a fluid pressure brake device, a valve device controlling a communication through which fluid under pressure is supplied to effect the operation of said fluid pressure brake device, said valve device having a movable abutment controlling opening and closing of said communication, said valve device also having two windings operable when energized to produce equal and opposite magnetic forces acting on said abutment and a third winding operable when energized to produce a preponderant magnetic force acting on said abutment, means for energizing said two windings to a substantially like degree, and means for energizing said third winding according to the degree of effectiveness of said electric brake system.

5. In an electrically controlled valve mechanism, in combination, a valve controlling a communication through which fluid under pressure is supplied to effect an application of the brakes, a movable abutment controlling operation of said valve, electromagnetic means for producing equal and opposite magnetic forces acting on said movable abutment, and a second electromagnetic means for producing variable preponderant magnetic forces acting in one direction only on said movable abutment.

6. In an electrically controlled valve mechanism, in combination, a movable abutment subject on both sides to fluid pressures, valve means controlled by movement of said movable abutment for controlling a communication through which fluid under pressure is supplied to effect an application of the brakes, a first magnetic means for producing equal magnetic forces acting on opposite sides of said abutment, and a second magnetic means for producing an additional magnetic force acting on one side only of said abutment.

7. In an electrically controlled valve mechanism, in combination, a movable abutment subject on both sides to fluid pressures, valve means controlled by movement of said movable abutment for controlling a communication through which fluid under pressure is supplied to effect an application of the brakes, a first magnetic means for producing equal magnetic forces acting on opposite sides of said abutment, a second magnetic means for producing a preponderant magnetic force acting on one side only of said abutment, and spring means for opposing said last mentioned magnetic force.

8. In a valve mechanism, in combination, valve means controlling a communication through which fluid under pressure is supplied to effect an application of the brakes, pneumatic means controlling operation of said valve means, electromagnetic means also controlling operation of said valve means, and a second electromagnetic means for producing equal and opposite forces acting on said valve means whereby to cause a predetermined relationship between the effectiveness of said pneumatic means and said first electromagnetic means.

9. In an electrically controlled valve mechanism, in combination, valve means controlling a communication through which fluid under pressure is supplied to effect an application of the brakes, a movable abutment controlling operation of said valve means, a first electromagnetic means, means for causing said movable abutment to control operation of said valve means according to fluid pressures exerted on said abutment and according to magnetic forces produced by said first electromagnetic means, and a second electromagnetic means for producing equal forces acting on opposite sides of said abutment to cause said abutment to weigh the pressure of fluid supplied through said communication according to the energization of said first electromagnetic means.

10. In a valve mechanism, in combination, means establishing a chamber to which fluid under pressure is supplied according to a desired degree of application of the brakes, a winding through which current is supplied to variable degrees, and means including two electromagnets producing equal and opposite forces for causing the pressure of fluid in said chamber to bear a direct relation to the variation of current in said winding.

11. In a valve mechanism, in combination, two electromagnetic means operable to produce magnetic forces acting in opposite directions, each of said electromagnetic means having a stationary member and a movable member spaced from said stationary member by an air gap, the movable member being movable toward said stationary member under the influence of magnetism, the movable member of one electromagnetic means being mechanically interconnected to the movable member of the other electromagnetic means, means for producing a preponderant magnetic force acting on the movable member in one of said electromagnets, whereby the air gap in one electromagnetic means decreases while the corresponding air gap in the other electromagnetic means increases, the magnetic force on each movable element varying with the variation in air gap, and means for compensating for the variation of force acting on each of said movable elements due to variations in the air gaps.

12. In an electrically controlled valve mechanism, in combination, valve means controlling a communication through which fluid under pressure is supplied to effect an application of the brakes, a movable abutment for controlling operation of said valve means, a first electromagnet operable to produce a force on one side of said abutment, a second electromagnet operable to produce an equal force on the other side of said abutment, each of said electromagnets having a stationary element and a movable element movable under the influence of magnetism through a gap toward said stationary element, means for producing a preponderant magnetic force acting on one side only of said abutment, said preponderant force causing the movable element in one electromagnet to move toward the stationary element in that electromagnet, and causing the movable element in the other electromagnet to move away from the stationary element in that electromagnet, the magnetic force acting on each of said movable members increasing with decreasing gap and decreasing with increasing gap, and spring means operable to substantially counterbalance the variations in magnetic force acting on said movable members due to variations in air gaps.

13. In an electrically controlled valve mechanism, in combination, valve means, a movable abutment controlling operation of said valve means, a first electromagnet operable to produce a magnetic force on one side of said diaphragm, a second electromagnet operable to produce a magnetic force on the opposite side of said abutment, means for producing a separate and additional magnetic force on the same side of said abutment as the force produced by said first electromagnet, the magnetic force acting on the last mentioned side of said abutment due to said first electromagnet increasing as said abutment moves under action of said additional force, and means for applying an increasing force to the opposite side of said abutment as it moves under action of said additional magnetic force.

14. In an electrical valve mechanism, in combination, valve means, a movable abutment controlling the operation of said valve means, a first electromagnet having a movable member operable to produce a magnetic force on one side of said abutment, a second electromagnet having a movable member operable to produce a magnetic force on the opposite side of said abutment, said two mentioned electromagnets being adapted when energized to the same degree to produce equal and opposite forces acting on said abutment, a third electromagnet operable to produce an additional magnetic force on one side only of said abutment, said additional magnetic force causing the movable member of said first electromagnet to move said abutment with increasing magnetic force, and causing the movable member of said second electromagnet to oppose movement of said abutment with a decreasing magnetic force, and spring means operable to compensate for the increasing force of the movable member of said first electromagnet and to compensate for the decreasing force of the movable member of said second electromagnet.

15. In a valve mechanism, in combination, two windings connected in parallel and adapted when energized to produce equal and opposite magnetic forces, a measuring winding adapted when energized to unbalance said magnetic forces according to the degree of energization thereof, pneumatic means responsive to fluid pressures established in a chamber, and valve means operated according to the balance or unbalance existing between fluid pressures operating on said pneumatic means and the unbalanced magnetic forces established by energization of said measuring winding.

JOHN B. GROSSWEGE.
JOHN CANETTA.